Patented Nov. 11, 1941

2,262,230

UNITED STATES PATENT OFFICE 2,262,230

PREPARATION OF FININGS

Alexander Henry Gillman, Rotherhithe, London, England, assignor to Gillman & Spencer Limited, London, England, an English joint-stock company No Drawing. Application August 12, 1939, Serial No. 289,925. In Great Britain August 13, 1938

6 Claims. (Cl. 252—316)

This invention relates to the preparation of finings, by which is meant isinglass in an acidic state, largely used to precipitate suspended matter from beer and other beverages.

The preparation of finings ordinarily requires a considerable length of time, the isinglass often taking as much as four to five weeks to dissolve in an acid solution, such as a mixture of tartaric and sulphurous acids. In order to ensure a constant supply of finings much storage equipment and space is therefore required. It is found, moreover, that finings gradually lose their efficacy upon standing for considerable periods and it is therefore advisable to use the finings within a reasonably short time after their preparation. In hot countries it is almost impossible to make or use finings at all since at temperatures in excess of 80° to 85° F., the ability to remove the sediment from the beer disappears and it is not practicable to keep a large amount of storage equipment below air temperature for any considerable time.

An object of the present invention is so to lessen the time required for the production of finings that much of the usual storage equipment can be dispensed with, the finings being made if desired just before use.

Primarily the invention contemplates the employment for the preparation of finings of isinglass in a fluffy fibrous, flocculent or powdery condition as distinguished from the large pieces usually employed or the slender strips into which it has previously been proposed to cut isinglass for the preparation of finings. The condition required by the present invention can be obtained by submitting the isinglass to a process of disrupture, that is by tearing or beating it in contradistinction to rolling and then cutting it into strips with knives. The operation may be conveniently carried out in a beater mill in which the isinglass is disintegrated by being beaten by rapidly moving blades or the like while suspended in the air.

When this disintegrated isinglass with the necessary acid is mixed into water it usually swells into little lumps of gel resembling cooked tapioca, and it is advisable to submit the suspension to strong agitation by a whisking or stirring treatment preferably of such a nature as to cause the little lumps of gel to be rubbed and squeezed so as to break them up and bring the suspension to an even consistency. A high-speed stirring or emulsifying machine will serve the purpose, or the suspension may be passed between closely assembled elements revolving relatively to each other, or the suspension may be forced through a narrow channel or channels of such cross section that the lumps of gel become rubbed and squeezed against each other and against the sides of the channel. A suitable breadth in cross section is about $\frac{1}{32}$ inch and it is of course advisable that the cross sectional length of the slot or channel should be relatively great so that as much finings can be prepared in as short a time as possible.

By such strong agitation it is possible to make finings from disintegrated isinglass within a few hours, and if the agitation is sufficiently strong finings can be made within as short a time as one hour.

The prepared isinglass preferably is admixed with the requisite quantity of acid, conveniently in the form of dry tartaric acid and acid sulphites, so that all that is necessary to produce finings is to add water and submit the suspension to the strong agitation above described. Alternatively of course the acids may be added with water.

It has been found desirable that the isinglass should not be rolled or subjected to heavy pressure or heated prior to its being beaten or disintegrated. It may be desirable however to cut it into pieces of convenient size for feeding to the mill, for instance into strips about 3 inches long and ½ inch wide or pieces roughly 1 to 2 inches square.

Isinglass obtained from different parts of the world varies in physical character and it is well known that some varieties dissolve more slowly than others and produce finings of inferior quality. It is known to be advantageous to use a mixture of several varieties of isinglass for the preparation of finings in the ordinary way. This applies equally and possibly to an even greater degree to the methods of the present invention, since it is mainly in the length of time taken to convert to the colloidal state that the different varieties of isinglass differ.

What I claim is:

1. In the manufacture of finings, the employment of isinglass in a fluffy fibrous, flocculent condition.

2. In the manufacture of finings from isinglass, the method of preparing the isinglass which comprises beating pieces of isinglass in air into a fluffy fibrous, flocculent condition.

3. The method of manufacturing finings which comprises suspending isinglass in a fluffy fibrous, flocculent condition in an acid solution and subjecting the suspension to strong agitation.

4. Isinglass in a fluffy fibrous, flocculent form mixed with dry acid compounds which with the addition of water produce finings.

5. The method of manufacturing finings which comprises suspending isinglass in a fluffy, fibrous, flocculent condition in a solution of dry tartaric acid and acid sulphites and subjecting the suspension to strong agitation.

6. The method of manufacturing finings which comprises suspending isinglass in a fluffy, fibrous, flocculent condition mixed with dry tartaric acid and acid sulphites, which, with the addition of water, produce finings.

ALEXANDER HENRY GILLMAN.